S. C. DAVIDSON.
CENTRIFUGAL FAN.
APPLICATION FILED MAY 23, 1913.

1,111,250.

Patented Sept. 22, 1914.
2 SHEETS—SHEET 1.

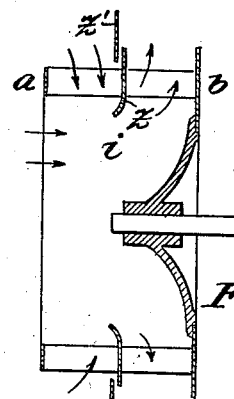
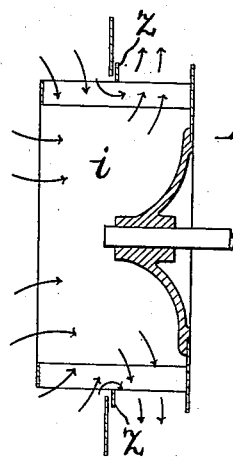
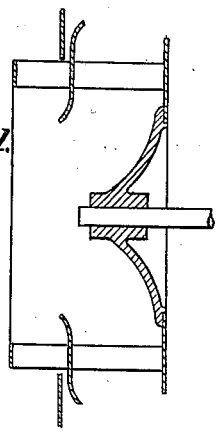
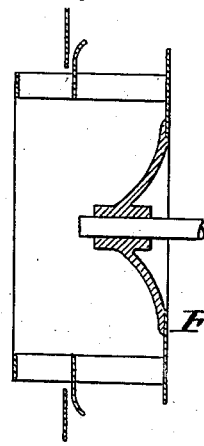
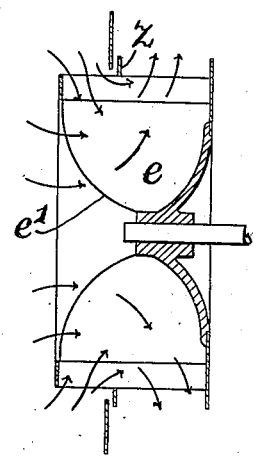
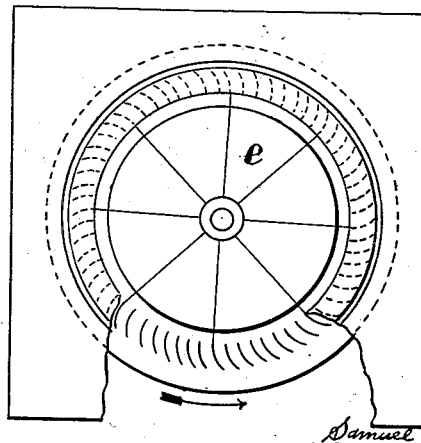
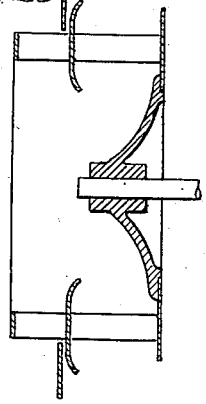

UNITED STATES PATENT OFFICE.

SAMUEL CLELAND DAVIDSON, OF BELFAST, IRELAND.

CENTRIFUGAL FAN.

1,111,250.  Specification of Letters Patent.  Patented Sept. 22, 1914.

Application filed May 23, 1913. Serial No. 769,362.

*To all whom it may concern:*

Be it known that I, SAMUEL CLELAND DAVIDSON, of Sirocco Engineering Works, Belfast, Ireland, have invented certain new and useful Improvements in or Relating to Centrifugal Fans, of which the following is a specification.

This invention relates to centrifugal fans of the kind which forms the subject of my application for Patent No. 722,220, filed 25th September 1912. In the fans described in my said application for patent, a fan wheel having an axial inlet is so arranged in relation to the case or other space in which it rotates that the intake or negative parts or ends of the blades protrude into and are so exposed to the space from which the air is drawn into the fan, that the air enters the fan wheel from said space both centripetally and axially, while the positive parts or ends of the blades are exposed to the space into which said air is circumferentially discharged, and means are provided in the form of a partition in the space surrounding the fan wheel which so divides the space outside the periphery of the fan wheel as to prevent the discharged air from returning to the space from which it is drawn.

According to the present invention, a partition is carried by or forms part of the fan wheel itself. It may extend outward from the periphery, and it may also extend inward through the blades for a suitable distance toward the axis. In some cases the inner edge or portion of the partition or the outer edge or portion, or both edges, may be curved or bent over to better direct the flow of air into, through or from the fan. The partition carried upon the fan wheel will generally meet or overlap another fixed partition mounted outside the fan wheel.

The blades of the fan wheel may in some cases with advantage be formed in parts or halves, secured to each side of the partition. In some cases I employ a form of fan wheel consisting of a large number of blades, long axially and short radially, in combination with a certain number of radially deep blades, which extend inward radially or in suitable curves to the hub or boss of the fan wheel, and these blades may extend axially for the full depth of the intake chamber, or for only part of the axial depth thereof, and their edges may be suitably shaped to suit the mounting, dimensions, and position of the fan wheel.

The position of the partition $z$ may be varied according to requirements for example it may be located centrally of the fan wheel blades at the neutral point thereof or it may be located nearer to the ends of the blades either on the positive or discharge side of the negative or intake side.

Referring to the drawings:—Figure 1 is a vertical section of one construction embodying the invention; Figs. 2 and 3 are respectively vertical section and side elevation of a fan wheel similar to Fig. 1 fitted with a casing; Figs. 4, 5, 6 and 7 are similar views to Fig. 1 showing modified constructions; and Fig. 8 is a front elevation of the fan wheel shown in Fig. 7. Figs. 9, 10, 11, 12 and 13 illustrate modifications showing the bending or curving of the inner edge, the outer edge and both edges of the partition.

Referring to Figs. 1, 2 and 3, the partition $z$ is here fixed to and forms part of the fan wheel $a$. Said partition is situated about half way between the ends of the fan wheel blades and extends from the inner edges of said blades outward beyond the periphery and overlaps a fixed partition $z'$ which serves to direct the air discharged from the positive portion of the fan wheel and to prevent same from returning to the negative side of the blades. It will be seen that in all the fans illustrated the air enters both axially and centripetally into the intake chamber $i$ and is discharged from the positive portion of the blades on the opposite side of the partitions $z$ $z'$ as indicated by the arrows. It will be readily obvious that if the partition $z$ is extended outward, a portion of the partition $z'$ may be dispensed with.

In Fig. 1 the fan wheel is supposed to be acting as a wall fan, of which the partition $z'$ either forms the wall or is attached thereto, while in Figs. 2 and 3 the positive part of the fan wheel discharges into a spiral casing $c$ which is preferably made deep in a radial direction as indicated, the negative portion of the blades protruding out from the casing into the space from which the air is drawn. A shield plate $p'$ may extend over the protruding end of the fan wheel.

Fig. 4 shows a modification wherein the partition $z$ is not centrally disposed, but is mounted more toward the negative ends of the blades, the positive or discharge portion of the fan wheel blades being thereby increased in axial length relative to the negative portion. The partition z may if desired be nearer the positive ends of the blades than the negative ends in which case the positive or discharge portion of the fan wheel will be decreased instead of increased.

Fig. 6 shows a modification where the partition z only extends inward as far as the outer edges of the fan wheel blades.

Figure 1:
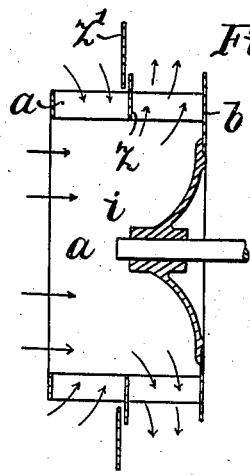
Figure 2:
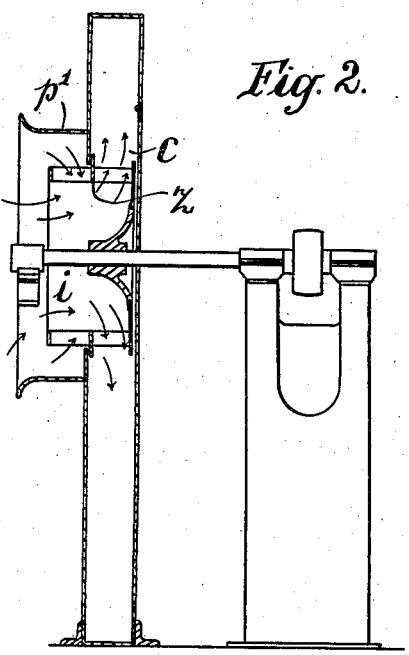
Figure 4:
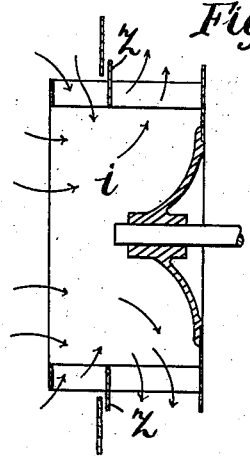
Figure 3:
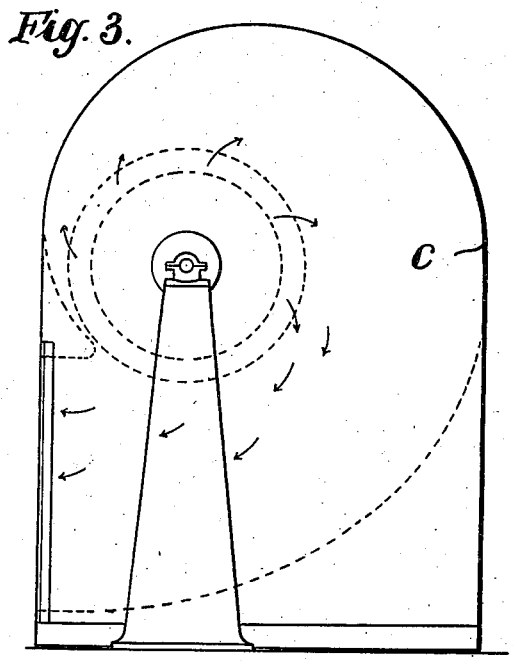
Figure 5:
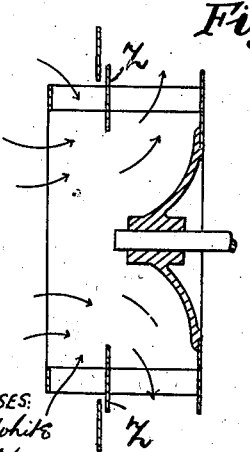
Fig. 5 shows a similar construction to Fig. 4 wherein the partition z is carried inward beyond the inner edges of the blades.

Figs. 7 and 8 show a further modification having a partition z similar to that shown in Fig. 6 wherein the fan wheel is not only provided with axially long blades such as described in prior Patent No. 662395 dated 27th November, 1900, but is also provided with a certain number of radially deep blades e which extend inward to the hub or boss of the fan wheel, the radial edges of these blades may be variously formed, for example they may take the formation shown in the elevation, Fig. 7, at e', and the said blades instead of being straight or flat as shown may be suitably curved as is usual with blades of this kind. The partition as shown in Fig. 7 extends only from the periphery of the blades outward; but, in this same construction, the partition z may be extended to the inner edge of the series of radially narrow blades as indicated in Figs. 1 and 4, or within their inner edges as indicated in Fig. 5.

In Fig. 9 is illustrated a construction wherein the inner edge of the partition is curved or bent toward the intake. In Fig. 10 the outer edge of the partition is illustrated as being bent in the opposite direction whereas in Fig. 11 I have illustrated a construction embodying the said curves at both edges of the partition.

Although the drawings show the multibladed drum type of fan, it is to be understood that the partition z shown may be applied to all those types of fan wheel as are specified in my said prior application for patent Serial No. 722,220/12.

What I claim and desire to secure by Letters Patent is:—

1. The combination with a centrifugal fan wheel having an axial intake of a partition carried by the fan wheel and disposed about the neutral part of the fan wheel blades, the negative part of the fan wheel on one side of the partition being exposed to the space from which the air is drawn whereby the air enters the fan wheel both axially and centripetally and the positive part of the fan wheel being disposed on the other side of said partition and discharging the air circumferentially.

2. The combination with a centrifugal fan wheel having an axial intake of a partition carried upon the fan wheel and forming part thereof, said partition being disposed between the ends of the fan wheel blades so as to separate the negative and the positive portions of the blades, the negative part of the fan wheel which is on one side of said partition being exposed to the space from which the air is drawn, whereby the air enters the fan wheel both axially and centripetally, and the positive part of the fan wheel being disposed on the other side of said partition and discharging the air circumferentially.

3. The combination with a centrifugal fan wheel having an axial intake of a partition carried by the fan wheel and disposed about the neutral part of the fan wheel blades, the negative part of the fan wheel on one side of the partition being exposed to the space from which the air is drawn and whereby the air enters the fan wheel both axially and centripetally and the positive part of the fan wheel being disposed on the other side of said partition and discharging the air circumferentially, and an external fixed partition encircling the fan wheel and forming an extension of the partition which is on the fan wheel.

4. The combination with a centrifugal fan wheel having an axial intake of a partition carried upon the fan wheel and forming part thereof, said partition being disposed between the ends of the fan wheel blades so as to separate the negative and the positive portions of the blades, the negative part of the fan wheel which is on one side of said partition being exposed to the space from which the air is drawn, whereby the air enters the fan wheel both axially and centripetally, and the positive part of the fan wheel being disposed on the other side of said partition and discharging the air circumferentially, and an external fixed partition encircling the fan wheel and forming an extension of the partition which is on the fan wheel.

5. The combination with a centrifugal fan wheel having an axial intake of a partition carried by the fan wheel and disposed about the neutral part of the fan wheel blades, said partition extending inward to the inner edges of the fan wheel blades, the negative part of the fan wheel on one side of the partition being exposed to the space from which the air is drawn whereby the air enters the fan wheel both axially and centripetally and the positive part of the fan wheel being disposed on the other side of said partition and discharging the air circumferentially.

6. The combination with a centrifugal fan wheel having an axial intake of a partition carried by the fan wheel and disposed about the neutral part of the fan wheel blades, said partition extending inward to and beyond the inner edges of the fan wheel blades, the negative part of the fan wheel on one side of the partition being exposed to the space from which the air is drawn whereby the air enters the fan wheel both axially and centripetally and the positive part of the fan wheel being disposed on the other side of said partition and discharging the air circumferentially.

7. The combination with a centrifugal fan wheel having an axial intake of a partition carried by the fan wheel and disposed about the neutral part of the fan wheel blades, said partition extending outward from the periphery of the fan wheel blades, the negative part of the fan wheel on one side of the partition being exposed to the space from which the air is drawn whereby the air enters the fan wheel both axially and centripetally, and the positive part of the fan wheel being disposed on the other side of said partition and discharging the air circumferentially.

8. The combination with a multi-bladed centrifugal fan wheel of the drum type having an axial intake and having some of the blades carried inward to about the axis, of a partition carried by the fan wheel and disposed about the neutral part of the fan wheel blades, the negative part of the fan wheel on one side of the partition being exposed to the space from which the air is drawn whereby the air enters the fan wheel both axially and centripetally, and the positive part of the fan wheel being disposed on the other side of said partition and discharging the air circumferentially.

9. The combination with a centrifugal fan wheel, having blades and having a substantially uniform diameter throughout the length of the blades, of a partition carried by the fan wheel and disposed between the ends of said blades, the negative part of each of said blades on one side of the partition being exposed to the space from which the air is drawn and the positive part of said blades on the other side of the partition being exposed to the space into which the air is discharged, and said fan having an axial intake whereby the air is taken in radially along and centripetally through the negative parts of said blades and is discharged centrifugally through the positive parts thereof.

In witness whereof, I have hereunto signed my name in the presence of two subscribing witnesses.

SAMUEL CLELAND DAVIDSON.

Witnesses:
JOHN JOHNSON,
HUGH TAYLOR COULTER.